(12) United States Patent
Dhillon et al.

(10) Patent No.: US 9,934,313 B2
(45) Date of Patent: *Apr. 3, 2018

(54) QUERY TEMPLATES AND LABELED SEARCH TIP SYSTEM, METHODS AND TECHNIQUES

(71) Applicant: FIVER LLC, Wilmington, DE (US)

(72) Inventors: Navdeep S. Dhillon, Seattle, WA (US); Jonathan Reichhold, Seattle, WA (US); Carsten Tusk, Seattle, WA (US)

(73) Assignee: FIVER LLC, Wilmington, DE (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/613,163

(22) Filed: Feb. 3, 2015

(65) Prior Publication Data

US 2015/0220640 A1 Aug. 6, 2015

Related U.S. Application Data

(62) Division of application No. 12/049,184, filed on Mar. 14, 2008, now Pat. No. 8,954,469.

(Continued)

(51) Int. Cl.
*G06F 17/30* (2006.01)

(52) U.S. Cl.
CPC .... *G06F 17/30864* (2013.01); *G06F 17/3053* (2013.01); *G06F 17/3061* (2013.01); *G06F 17/30398* (2013.01); *G06F 17/30554* (2013.01)

(58) Field of Classification Search
CPC ............................................... G06F 17/30398

(Continued)

(56) References Cited

U.S. PATENT DOCUMENTS

| 4,839,853 | A | 6/1989 | Deerwester et al. ......... 364/900 |
| 4,887,212 | A | 12/1989 | Zamora et al. |

(Continued)

FOREIGN PATENT DOCUMENTS

| EP | 0 280 866 | 9/1988 |
| EP | 0 585 079 | 3/1994 |

(Continued)

OTHER PUBLICATIONS

Abraham, "FoXQ—Xquery by Forms," Human Centric Computing Languages and Environments, IEEE Symposium, Oct. 28-31, 2003, Piscataway, New Jersey, pp. 289-290.

(Continued)

*Primary Examiner* — Chelcie Daye
(74) *Attorney, Agent, or Firm* — Perkins Coie LLP

(57) ABSTRACT

Methods, systems, and techniques for creating, managing, and using query templates to facilitate the execution of relationship queries are provided. Example embodiments provide a Query Template System "QTS", which enables users, a system, program code, or other people or code to define search tips (i.e., predefined searches) through the generation of query templates that can be used by other users or code, to perform relationship searches using IQL. In one embodiment, the QTS includes a QT editor, a QT dispatcher, a QT creation and index management system, and one or more QT data repositories and indexes. These components cooperate to create and maintain query templates and to search for and retrieve matching query templates. This abstract is provided to comply with rules requiring an abstract, and it is submitted with the intention that it will not be used to interpret or limit the scope or meaning of the claims.

26 Claims, 17 Drawing Sheets

Life Sciences Example

- Description: Explore Gene / Protein Induction
- Sample syntax:
  {user([gene])}<>induce<>[protein]
- Tagged: genes, proteins, induction, genes and proteins
- Displays as: [Explore Gene / Protein Induction — Enter Gene: ___ Search]

Related U.S. Application Data

(60) Provisional application No. 60/894,876, filed on Mar. 14, 2007.

(58) Field of Classification Search
USPC .......................................................... 707/779
See application file for complete search history.

(56) References Cited

U.S. PATENT DOCUMENTS

| | | | |
|---|---|---|---|
| 5,301,109 A | 4/1994 | Landauer et al. ....... 364/419.19 |
| 5,317,507 A | 5/1994 | Gallant ................... 364/419.13 |
| 5,325,298 A | 6/1994 | Gallant ................... 364/419.19 |
| 5,331,556 A | 7/1994 | Black, Jr. et al. ....... 364/419.08 |
| 5,377,103 A | 12/1994 | Lamberti et al. ........ 364/419.08 |
| 5,590,322 A | 12/1996 | Harding et al. |
| 5,619,709 A | 4/1997 | Caid et al. ..................... 395/794 |
| 5,634,051 A | 5/1997 | Thomson ..................... 395/605 |
| 5,752,022 A | 5/1998 | Chiu ............................ 395/610 |
| 5,778,362 A | 7/1998 | Deerwester ....................... 707/5 |
| 5,794,050 A | 8/1998 | Dahlgren et al. ............. 395/708 |
| 5,794,178 A | 8/1998 | Caid et al. ........................ 704/9 |
| 5,799,268 A | 8/1998 | Boguraev .......................... 704/9 |
| 5,848,417 A | 12/1998 | Shoji et al. ..................... 707/102 |
| 5,857,179 A | 1/1999 | Vaithyanathan et al. ......... 707/2 |
| 5,884,302 A | 3/1999 | Ho .................................... 707/3 |
| 5,933,822 A | 8/1999 | Braden-Harder et al. ........ 707/5 |
| 5,950,189 A | 9/1999 | Cohen et al. ...................... 707/3 |
| 5,982,370 A | 11/1999 | Kamper .......................... 345/356 |
| 6,006,221 A | 12/1999 | Liddy et al. ....................... 707/5 |
| 6,026,388 A | 2/2000 | Liddy et al. ....................... 707/1 |
| 6,061,675 A | 5/2000 | Wical .............................. 706/45 |
| 6,064,951 A | 5/2000 | Park et al. ......................... 704/8 |
| 6,122,647 A | 9/2000 | Horowitz et al. ............. 707/513 |
| 6,167,368 A | 12/2000 | Wacholder ........................ 704/9 |
| 6,178,416 B1 | 1/2001 | Thompson et al. .............. 707/3 |
| 6,192,360 B1 | 2/2001 | Dumais et al. ................... 707/6 |
| 6,202,064 B1 | 3/2001 | Julliard ............................. 707/5 |
| 6,219,664 B1 | 4/2001 | Watanabe .......................... 707/3 |
| 6,246,977 B1 | 6/2001 | Messerly et al. ................. 704/9 |
| 6,363,373 B1 | 3/2002 | Steinkraus ........................ 707/3 |
| 6,405,190 B1 | 6/2002 | Conklin ............................ 707/3 |
| 6,411,962 B1 | 6/2002 | Kupiec ......................... 707/102 |
| 6,460,029 B1 | 10/2002 | Fries et al. ........................ 707/3 |
| 6,484,162 B1 | 11/2002 | Edlund et al. .................... 707/3 |
| 6,510,406 B1 | 1/2003 | Marchisio ......................... 704/9 |
| 6,584,464 B1 | 6/2003 | Warthen ............................ 704/7 |
| 6,601,026 B2 | 7/2003 | Appelt et al. ..................... 704/9 |
| 6,728,707 B1 | 4/2004 | Wakefield et al. ................ 707/5 |
| 6,732,097 B1 | 5/2004 | Wakefield et al. ................ 707/5 |
| 6,732,098 B1 | 5/2004 | Wakefield et al. ................ 707/5 |
| 6,738,765 B1 | 5/2004 | Wakefield et al. ................ 707/5 |
| 6,741,988 B1 | 5/2004 | Wakefield et al. ................ 707/7 |
| 6,745,161 B1 | 6/2004 | Arnold et al. .................... 704/7 |
| 6,757,646 B2 | 6/2004 | Marchisio ......................... 704/8 |
| 6,859,800 B1 | 2/2005 | Roche et al. ..................... 707/3 |
| 6,862,710 B1 | 3/2005 | Marchisio .................... 715/501.1 |
| 6,904,433 B2 | 6/2005 | Kapitskaia et al. ............. 707/10 |
| 6,910,003 B1 | 6/2005 | Arnold et al. .................... 704/4 |
| 6,996,575 B2 | 2/2006 | Cox et al. ..................... 707/102 |
| 7,051,017 B2 | 5/2006 | Marchisio ......................... 707/3 |
| 7,054,854 B1 | 5/2006 | Hattori et al. .................... 707/3 |
| 7,171,349 B1 | 1/2007 | Wakefield et al. ............... 704/9 |
| 7,283,951 B2 | 10/2007 | Marchisio et al. ............... 704/9 |
| 7,398,201 B2 | 7/2008 | Marchisio et al. ............... 704/9 |
| 7,403,938 B2 * | 7/2008 | Harrison ........... G06F 17/30663 707/3 |
| 7,451,135 B2 | 11/2008 | Goldman et al. ................. 707/3 |
| 7,526,425 B2 | 4/2009 | Marchisio et al. ............... 704/9 |
| 7,529,756 B1 | 5/2009 | Haschart et al. .............. 707/100 |
| 7,752,200 B2 | 7/2010 | Scholl et al. .................. 707/730 |
| 7,788,084 B2 | 8/2010 | Brun et al. ........................ 704/7 |
| 8,122,016 B1 | 2/2012 | Lamba et al. ................. 707/723 |
| 8,594,996 B2 | 11/2013 | Liang et al. |
| 8,666,909 B2 | 3/2014 | Pinckney et al. ............... 706/11 |
| 8,700,604 B2 | 4/2014 | Roseman et al. ............. 707/716 |
| 8,725,739 B2 | 5/2014 | Liang ............................ 707/40 |
| 8,856,096 B2 | 10/2014 | Marchisio et al. |
| 8,954,469 B2 | 2/2015 | Dhillon et al. |
| 2002/0007267 A1 | 1/2002 | Batchilo et al. ................... 704/9 |
| 2002/0010574 A1 | 1/2002 | Tsourikov et al. ............... 704/9 |
| 2002/0022956 A1 | 2/2002 | Ukrainczyk et al. ............ 704/9 |
| 2002/0059161 A1 | 5/2002 | Li ...................................... 707/1 |
| 2002/0078041 A1 | 6/2002 | Wu ................................... 707/4 |
| 2002/0078045 A1 | 6/2002 | Dutta ................................ 707/7 |
| 2002/0091671 A1 | 6/2002 | Prokoph .......................... 707/1 |
| 2002/0103789 A1 | 8/2002 | Turnbull et al. ................. 707/3 |
| 2002/0120651 A1 | 8/2002 | Pustejovsky et al. ........ 707/513 |
| 2003/0004716 A1 | 1/2003 | Haigh et al. .................. 704/238 |
| 2003/0101182 A1 | 5/2003 | Gorvin et al. .................... 707/7 |
| 2003/0115065 A1 | 6/2003 | Kakivaya et al. .......... 704/270.1 |
| 2003/0115191 A1 | 6/2003 | Copperman et al. ............. 707/3 |
| 2003/0191626 A1 | 10/2003 | Al-Onzian et al. ............... 704/8 |
| 2003/0233224 A1 | 12/2003 | Marchisio et al. ............... 704/4 |
| 2004/0010508 A1 | 1/2004 | Fest et al. ..................... 707/102 |
| 2004/0125877 A1 | 7/2004 | Chang et al. ............. 375/240.28 |
| 2004/0167870 A1 | 8/2004 | Wakefield et al. ................ 707/1 |
| 2004/0167883 A1 | 8/2004 | Wakefield et al. ................ 707/3 |
| 2004/0167884 A1 | 8/2004 | Wakefield et al. ................ 707/3 |
| 2004/0167885 A1 | 8/2004 | Wakefield et al. ................ 707/3 |
| 2004/0167886 A1 | 8/2004 | Wakefield et al. ................ 707/3 |
| 2004/0167887 A1 | 8/2004 | Wakefield et al. ................ 707/3 |
| 2004/0167907 A1 | 8/2004 | Wakefield et al. ............. 707/100 |
| 2004/0167908 A1 | 8/2004 | Wakefield et al. ............. 707/100 |
| 2004/0167909 A1 | 8/2004 | Wakefield et al. ............. 707/100 |
| 2004/0167910 A1 | 8/2004 | Wakefield et al. ............. 707/100 |
| 2004/0167911 A1 | 8/2004 | Wakefield et al. ............. 707/100 |
| 2004/0205448 A1 | 10/2004 | Grefenstette et al. |
| 2004/0221235 A1 | 11/2004 | Marchisio et al. ............ 715/534 |
| 2004/0243388 A1 | 12/2004 | Corman et al. ................... 704/1 |
| 2005/0027704 A1 | 2/2005 | Hammond et al. ............... 707/5 |
| 2005/0049852 A1 | 3/2005 | Chao |
| 2005/0076365 A1 | 4/2005 | Popov et al. ................... 725/46 |
| 2005/0080613 A1 | 4/2005 | Colledge et al. |
| 2005/0108001 A1 | 5/2005 | Aarskog ......................... 704/10 |
| 2005/0138018 A1 | 6/2005 | Sakai et al. ...................... 707/3 |
| 2005/0149473 A1 | 7/2005 | Weare |
| 2005/0149494 A1 | 7/2005 | Lindh et al. ...................... 707/3 |
| 2005/0197828 A1 | 9/2005 | McConnell et al. .............. 704/9 |
| 2005/0210000 A1 | 9/2005 | Michard ........................... 707/3 |
| 2005/0234968 A1 | 10/2005 | Arumainayagam et al. .. 707/102 |
| 2005/0262050 A1 | 11/2005 | Fagin et al. ...................... 707/3 |
| 2005/0267871 A1* | 12/2005 | Marchisio ......... G06F 17/30672 707/3 |
| 2006/0149734 A1 | 7/2006 | Egnor et al. ...................... 707/7 |
| 2006/0167862 A1 | 7/2006 | Reisman ........................... 707/3 |
| 2006/0224565 A1 | 10/2006 | Ashutosh et al. ................ 707/3 |
| 2006/0229889 A1 | 10/2006 | Hodjat et al. ................. 709/202 |
| 2006/0271353 A1 | 11/2006 | Berkan et al. .................... 704/9 |
| 2006/0279799 A1 | 12/2006 | Goldman ..................... 358/403 |
| 2006/0287971 A1 | 12/2006 | Armstrong |
| 2007/0136326 A1 | 6/2007 | McClement et al. ......... 707/100 |
| 2007/0156669 A1 | 7/2007 | Marchisio et al. ............... 707/4 |
| 2007/0233656 A1 | 10/2007 | Bunescu et al. .................. 707/3 |
| 2007/0276830 A1 | 11/2007 | Gruhl et al. ...................... 707/7 |
| 2008/0005651 A1 | 1/2008 | Grefenstette et al. ........ 715/500 |
| 2008/0097975 A1 | 4/2008 | Guay et al. ...................... 707/4 |
| 2008/0120129 A1 | 5/2008 | Seubert et al. ................. 705/35 |
| 2008/0127331 A1 | 5/2008 | Seidman et al. |
| 2008/0208864 A1 | 8/2008 | Cucerzan et al. ................ 707/8 |
| 2008/0222105 A1 | 9/2008 | Matheny |
| 2008/0228720 A1 | 9/2008 | Mukherjee et al. .............. 707/3 |
| 2008/0235203 A1 | 9/2008 | Case et al. ........................ 707/5 |
| 2008/0249991 A1 | 10/2008 | Valz |
| 2009/0070325 A1 | 3/2009 | Gabriel et al. ................... 707/5 |
| 2009/0144609 A1 | 6/2009 | Liang et al. .................. 715/230 |
| 2009/0187467 A1 | 7/2009 | Fang et al. ..................... 705/10 |
| 2009/0248678 A1 | 10/2009 | Okamoto ......................... 707/5 |
| 2009/0327223 A1 | 12/2009 | Chakrabarti et al. |
| 2010/0010994 A1 | 1/2010 | Wittig et al. ...................... 707/6 |
| 2010/0299326 A1 | 11/2010 | Germaise ..................... 707/728 |

(56) References Cited

U.S. PATENT DOCUMENTS

2011/0208801 A1 8/2011 Thorkelsson et al.
2013/0124510 A1 5/2013 Guha .......................... 707/723

FOREIGN PATENT DOCUMENTS

| EP | 0 597 630 | 5/1994 |
|---|---|---|
| WO | 00/14651 | 3/2000 |
| WO | 00/57302 | 9/2000 |
| WO | 01/22280 | 3/2001 |
| WO | 01/80177 | 10/2001 |
| WO | 02/27536 | 4/2002 |
| WO | 02/33583 | 4/2002 |
| WO | 2004/053645 | 6/2004 |
| WO | 07/113546 | 10/2007 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knoweldge Discovery*, Nantes, France, 1998, pp. 1-9.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations 7(1):67-75, Jun. 2005.

Littman et al., "Automatic Cross-Language Information Retrieval Using Latent Semantic Indexing," *In Grefenstette, G. editor*, Cross Language Information Retrieval. Kluwer, 1998, pp. 1-11.

Nagao et al., "Semantic Annotation and Transcoding: Making Web Content More Accessible," *IEEE Multimedia, IEEE Computer Society*, US, 8(2):69-81, Apr. 2001.

Nguyen et al., "Accessing Relational Databases from the World Wide Web," SIGMOD Record ACM USA, Jun. 1996, vol. 25, No. 2, pp. 529-540.

Pohlmann et al., "The Effect of Syntactic Phrase Indexing on Retrieval Performance for Dutch Texts," *Proceedings of RIAO*, pp. 176-187, Jun. 1997.

Sneiders, "Automated Question Answering Using Question Templates That Cover the Conceptual Model of the Database," *Natural Language Processing and Information Systems, 6th International Conference on Applications of Natural Language to Information Systems*, Revised Papers (Lecture Notes in Computer Science vol. 2553) Springer-Verlag Berlin, Germany, 2002 vol. 2553, pp. 235-239.

Volz, Raphael et al., "Towards ontology-based disambiguation of geographical identifiers," Jan. 1, 2007, XP055003728, 7 pages.

William H. Press et al.: "Backus-Gilbert Method, Chapter 18.6" In: "Fortran Numerical Recipes Second Edition", Jan. 1, 1996, Cambridge University Press, XP055083119, pp. 806-809.

DARPA-61 Phase I Selections from the 99.1 Solicitation, Jul. 1, 1999, p. 21 of 30, entitled "An Inverse Inference Engine for High Precision Web Search" by Marchisio, topic# DARPA 99-020.

* cited by examiner

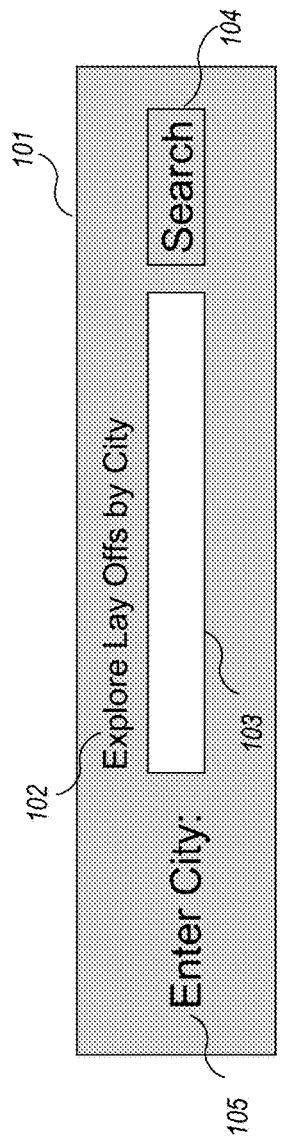
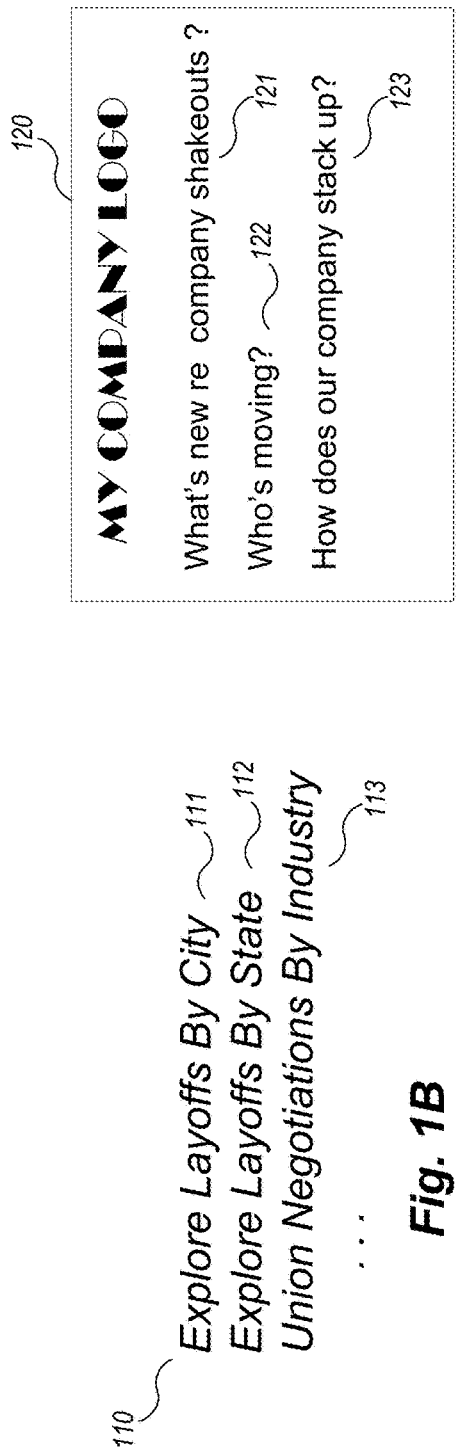

Query Template 200

- 201: QT ID
- 202: Description (e.g., text to display to user)
- 203: Query (e.g., IQL may include I/O output specifications)
- 204: Trigger Tags
- 205: Trigger Types
- 206: . . .
- 207: Other information (e.g., priority info, popularity, deep tips)

*Fig. 2*

Life Sciences Example

- Description: Explore Gene / Protein Induction
- Sample syntax:

user([gene])<>induce<>[protein]

- Tagged: genes, proteins, induction, genes and proteins
- Displays as:

Explore Gene / Protein Induction

Enter Gene: [        ] [Search]

*Fig. 3A*

Finance Example

- Description: Explore Lay Offs by City ⟵ 321
- syntax: [company]>lay off ~ [numeric] and ⟵ 323

[ user([city]) ] ⟵ 322
- Tagged: corporate lay off, downsizing
- Displays as:

324 — Enter City: [ Explore Lay Offs by City ] [Search]

Results Modification
Life Sciences Example

- Display forms of relationships
- user([gene])<>induce<>display([protein])  — 313
  – Displays as:

Explore Gene / Protein Induction
  Enter Gene: [        ]  — 310
  [Search]

– Results in itemized list not relationships:  — 311
  - AP1
  - EGFR   — 312
  - STAT3

*Fig. 3C*

Results Modification
Finance Example

- Display forms of relationships
  - user([company])>aquire >display([company])
    - Displays as:

Company Acquisitions

Enter Company: [      ]  [Search]

- Results in itemized list not relationships. For company Google:
  - YouTube
  - Blogger
  - Picassa

*Fig. 3D*

Example Table Results

Directors and Movies
[Director] {col1,label=Director} > * > [Movie] {col2,label=Movie}

Example results:

| Director | Movie |
|---|---|
| Oliver Stone | Born on the Fourth of July |
| | JFK |
| Tim Burton | Alice |
| Kevin Lima | 102 Dalmations |

Corporate Acquisitions
[Company] {col1,label=Acquiring Company} > buy > [Company]
{col2,label=Acquired Company}
^ [Money] {col3,label=Amount}

Example results:

| Acquiring Company | Acquired Company | Amount |
|---|---|---|
| Celgene | Pharmion | $2.9B |
| Macy's | May Department Stores | $11B |
| Google | YouTube | $1.5B |

*Fig. 3E*

QUERY TEMPLATES AND LABELED SEARCH TIP SYSTEM, METHODS AND TECHNIQUES

CROSS-REFERENCE TO RELATED APPLICATIONS

This application is a divisional of U.S. application Ser. No. 12/049,184, filed Mar. 14, 2008, entitled "QUERY TEMPLATES AND LABELED SEARCH TIP SYSTEM, METHODS, AND TECHNIQUES", which claims the benefit of U.S. Provisional Application No. 60/894,876, filed Mar. 14, 2007, entitled "QUERY TEMPLATE AND LABELED NAVIGATION TIP SYSTEM AND METHODS", both of which are incorporated by reference herein in their entireties.

TECHNICAL FIELD

The present disclosure relates to methods, systems, and techniques for generating and using relationship queries and, in particular, to methods, systems, and techniques for generating and using query templates to facilitate in the formulation and processing of relationship queries.

BACKGROUND

A relationship query language, such as InFact® Query Language (IQL), which supports queries that express relationships between entities such as persons, places, or things using actions or events, is often difficult for many users to learn. One reason is that the syntax for such queries may be unfamiliar, and users may be accustomed to keyword matching based search systems. Even when relationship queries are supported, it has been found that often user queries are simple keywords rather than complex relationship expressions. This trend is not expected to change in the near term.

In addition, many third party applications exist which leverage more advanced users' abilities to tag or label "items" (such as web pages, images, etc.) that users have discovered by browsing web pages, using keyword search engines or through other discovery means. In some of these applications, the tags or labeled items may form a focus for a community that uses the application. For example, social networking sites typically allow users to create or use existing "tags" or "labels" (e.g., words that are used as keys for finding or relocating information) and to assign them to various electronic data, such as url-locatable (e.g., web) pages. Other users of the same social networking site can then locate related information (such as other url pages) by specifying one or more of the defined tags or labels.

BRIEF DESCRIPTION OF THE DRAWINGS

FIGS. 1A-1C illustrate three different example user interfaces usable to directly or indirectly trigger query templates generated by an example Query Template System.

FIG. 2 is an abstraction of example attributes defined by a query template.

FIGS. 3A-3E illustrate the incorporation of various attributes of query templates into interfaces for different disciplines and uses.

DETAILED DESCRIPTION

Figure 3B:
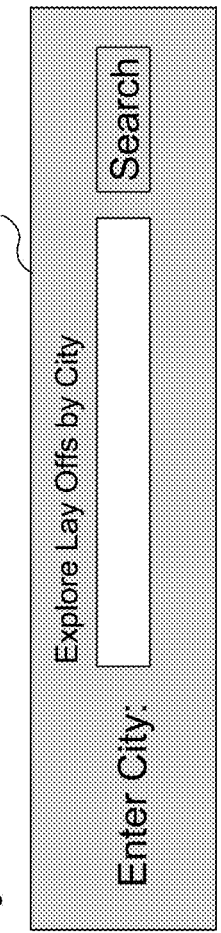

Embodiments described herein provide enhanced computer- and network-based methods, systems and techniques for generating and using query templates for specifying, triggering, and/or facilitating the processing of relationship queries, such as those formed using Infact® Query Language ("IQL") (alternatively referred to as Insightful® Query Language in some documentation). Example embodiments provide a Query Template System ("QTS"), which enables users, a system, program code, or other people or code that understands a relationship query language, such as IQL, to define search tips (i.e., predefined searches) through the generation of query templates that can be used by other users or code, for example that may not understand IQL, to perform relationship searches using IQL. For example, a user who doesn't know IQL can select a description of a query (e.g., a link to a query template) using some type of user interface, thereby causing one or more query templates to be invoked or triggered, which in turn causes the associated relationship search specification to be executed by an appropriate relationship search engine. Query templates may also be invoked or triggered by users and/or code that understands the underlying query language, for example to provide an easier or alternative interface to executing relationship queries.

FIGS. 1A, 1B, and 1C illustrate three different example user interfaces usable to directly or indirectly trigger query templates generated by an example Query Template System. Specifically, FIG. 1A shows an example interactive "form" 101 (e.g., which may be embedded in a web page, displayed in a pop-up window, etc.) in which a user types in a designated entity, a city, into input field 103. This particular form uses a description field 102 defined by the query template to describe the search to the user. When the user selects the Submit button 104, a relationship query (e.g., an IQL expression) associated with the query template is executed and the results are displayed.

FIG. 1B shows another example interface 110, which comprises one or more links 111-113 (e.g., uniform resource identifiers, commonly referred to as URIs, or uniform resource locators, commonly referred to as URLs) that can be selected by a user to cause a corresponding query template to be triggered. For example, the link 111 labeled "Explore Layoffs By City" may be associated with the same query template that is invoked by the interface of form 101. This particular user interface does not necessitate the user typing in input.

FIG. 1C shows another example interface 120, which represents a web page for browsing information about various people, places, things, topics, and concepts. Different questions 121-123 are presented to the user for further perusal. When the user selects a question, a query template is triggered (transparently to the user), the results of which are displayed (not shown). For example, question 121 may be associated and trigger the same query template that is invoked by the interface of form 101.

Other interfaces for triggering query templates are also possible, including those that automatically present results without requiring any interaction from a user. For example, interfaces can be programmed to automatically present the search results of various query templates that are related to the entities, topics, or concepts being perused by a user, by triggering related query templates in the background and displaying the results of their associated relationship searches automatically.

Relationship queries typically entail searches for how one or more specified entities, entity types, ontology paths, topics, concepts, actions, action types, or events relate to other such entities, entity types, topics, concepts, ontology paths, actions, action types, or events. Thus, relationship searches often result in more meaningful information about how what is found relates to what was entered in a query by attempting to better understand what was intended by the query and to obtain more relevant results. In contrast, keyword searches simply perform exact or partial (substring) matches of words or phrases in a document and typically cannot determine grammatical clause based related information. For example, a relationship search on the entity "Hillary Clinton" in relation to activities she's been doing in "Chicago" (e.g., expressed as '*>attack>Hillary Clinton~Chicago' using IQL) may result in matching document segments that show how the document segment relates. For example, the document segment:

CHICAGO, August 7—Sens. Barack Obama and Hillary Rodham Clinton came under sharp attack from their Democratic presidential rivals in a highly spirited debate here Tuesday night, with Obama rebuked as irresponsible on foreign policy and Clinton accused of being too cozy with corporate America and Washington lobbyists.

expresses the relationship: Democratic presidential rivals (source) attack (action) Barack Obama and Hillary Clinton (targets). This result gives the user more meaningful information at a glance (by listing the action and the entity roles) about what Hillary Clinton was doing in Chicago. If the user had simply searched for the keywords "Hillary Clinton" and "Barrack Obama" (or even "Senator" and "Clinton") a keyword search may have matched the sentence, since the keywords are present in the document, but the document segment result might be buried down in the result list since the search was not performing a narrow search of something attacking Hillary Clinton in Chicago. Even if the relationship search had not specified any particular action (through the use of an IQL expression such as '*>*>Hillary Clinton-~Chicago'), the result list could group matching document segments by action to enable the user to see at a glance instances of Hillary Clinton undergoing attack in Chicago as one of her activities in Chicago.

Relationship searching is an integral part of the examples used herein. Accordingly, this description presumes some familiarity with InFact®, the InFact® Query Language (IQL), and the InFact® query processing architecture as an example architecture for processing relationship queries. Additional information on relationship searches generally and on the InFact® system, IQL, and example components that can be implemented and integrated to process IQL is provided in U.S. Patent Publication No. 2005/0267871A1, published on Dec. 1, 2005, herein incorporated by reference in its entirety. Although this description refers primarily to IQL, it is to be understood that the concepts and techniques described herein are applicable to other relationship query languages as they are or become available.

In some embodiments of the QTS, various query template editors can be provided to create, delete and/or edit query templates. Some embodiments of the QTS also enable a system or code that is capable of processing query language expressions, such as IQL, to automatically tag or otherwise label queries and to automatically generate and store query templates. Query templates can be automatically generated, for example, as part of a navigation tip system, when the query "tip" is invoked, executed, displayed, or at some other time. Additional information on the InFact® navigation tip system is found in U.S. Patent Publication No. 2007/0156669, published on Jul. 5, 2007, which is herein incorporated by reference in its entirety.

Once one or more query templates are defined they can be stored in a data repository so that keyword search engines, third party applications and/or code, for example even code that does not understand IQL, can automatically retrieve desired/matching relationship query templates and present them, for example as search tips to aid users or to augment or enhance information that the keyword search engine, third party application, and/or code is presenting. For example, a news reporting tool (such as a client-side portal or widget) can integrate tagged or labeled relationship queries (e.g., by presenting links to query templates directly or indirectly) to automatically enhance or augment, with the results of the relationship queries, information that is being presented to users. For example, links to query templates such as represented by urls, pathnames, question, or icons, etc. that represent related information can be presented so that the user who read the article can find other pertinent information by selecting the link representation.

In addition, query templates can be incorporated into code that understands the relationship search language or that has the ability to pass relationship search language expressions such as IQL to an IQL system for processing. Also, users may run relationship searches produced by the QTS (by triggering query templates) and can incorporate the results of such searches into other applications. Also, users or code may "subscribe" to query templates associated with particular tags or to streamed downloading of query templates, such as through an RSS feed. Other incorporation or embedding scenarios are also contemplated.

Query templates have one or more associated attributes that indicate the associated relationship query and typically one or more attributes related to defining input or how the query template is triggered (e.g., keys or triggers) and defining output or how the query template returns query results. FIG. 2 is an abstraction of example attributes defined by a query template. Example query template 200 comprises attributes 201-207, although other attributes could be similarly supported. QT ID 201 is an identifier used to identify and/or track the query template. The description attribute 202 may be used in applications that wish to present some information regarding the query. For example, in FIG. 1A, the field 102 reflects the corresponding description attribute of the associated query template. Query attribute 203 is the query itself. Using IQL, this query may include expressions that identify particulars about the input and output specifications as described further with respect to FIGS. 3A-3E. For example, the query may include the expression 'user ([city])' to cause the input form of FIG. 1A to include the explanation 105 and input field 103. Trigger tags attribute 204 may be used to match "keys" to find and retrieve appropriate query templates. Similarly, trigger types attribute 205 may be used to associate the instant query template when the indicated types are encountered. Other attributes 207 may be used to store priority, popularity, and other information that may be used, for example, to retrieve one query template over another, or to list them in a particular order, etc.

FIGS. 3A-3E illustrate the incorporation of various attributes of query templates into interfaces for different disciplines and uses. In these cases, IQL has been extended to indicate input and output specifications. FIG. 3A illustrates several attributes of an example query template and an example user interface for triggering a relationship query in the life sciences area. The query template attributes including description 301, query 302 and tags 304 define information to present on interactive input form 305. In particular, the syntax 303, 'user([gene])' indicates the explanation field 309 and the user input field 308; and the description attribute 301 is used as a title 307 on the input form. When the user selects the search button 306, query 302 is caused to be executed. Similarly, FIG. 3B illustrates several attributes of an example query template and an example user interface for triggering a relationship query in the finance area. The description 321 and input syntax 322 of query 323 are used to similarly populate the input form 324.

FIG. 3C illustrates several attributes of an example query template used to display results from a relationship query in the life sciences area as an entity list. The display syntax 310 'display([protein])' of the query 313 is used to cause the output from executing the relationship query 313 to be presented as an itemized list 312 of entities, in this case proteins. Similarly, FIG. 3D illustrates several attributes of an example query template used to display results from a relationship query in the finance area as an entity list. Note as well that other display parameters may be specified, such as those that order the list, for example, in an order, such as by popularity, frequency, alphanumeric, etc. The display syntax 316 of query 315 is used to formulate the presentation of the resultant entities 317. Note as well that other display parameters may be specified, such as those that order the list, for example, in an order, such as by popularity, frequency, alphanumeric, etc.

FIG. 3E illustrates example query templates used to display results from a relationship query in a customizable tabular format instead of a linear list. In the first example 350, the relationship query 351 expressed in IQL obtains relationships between directors and movies. The expression '[Director] {col1, label=Director}' 353 is syntax in an extended version of IQL for describing that the resultant output should have a first column labeled 'Director' listing all 'director' entities that appear in resultant relationships that match the search query 351 (which is IQL specifying a relationship search to find all clauses, sentences, etc. that describe events or actions between director entities and movie entities). Similarly, the expression 'Movie {col2, label=Movie)' 353 is syntax in an extended version of IQL for describing that the resultant output should have a second column labeled 'Movie' listing all 'movie' entities that appear in resultant relationships that match the search query 351. The results of executing the query 351 and presenting the results according to this output specification is shown in table 356, which contains a first column 354 listing the directors found, and a second column 355 listing the movies. Similarly, in the second example 360, the relationship query 361 expressed in IQL obtains acquisition type relationships between companies. The output specifications in the IQL, expressions 362-364 indicate that the output is to be expressed in three columns, as shown in resultant output table 368.

Example embodiments described herein provide applications, tools, data structures and other support to implement a Query Template System to be used for query templates associated with relationship queries. As discussed, "relationship query" is used generally as an example of search queries where query templates are particular useful. Other uses of query templates—such as to define better input and output specifications for complex keyword searching are also possible. Also, although the examples described herein often refer to IQL, the techniques described herein can also be used with other query languages. In addition, the concepts and techniques described are applicable to other forms of applications, code, and interfaces, including other types of client-side applications, other web-clients, plug-ins, etc., and generally, other code, whether a standalone executable or module. Also, although certain terms are used primarily herein, other terms could be used interchangeably to yield equivalent embodiments and examples. Although the techniques of query templates and the QTS are generally applicable to any type of interface, the phrase "user interface" or "interface" is used generally to imply any type of method, technique or object used to trigger behavior in a computing system. In addition, terms may have alternate spellings which may or may not be explicitly mentioned, and all such variations of terms are intended to be included.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular block or routine.

Figure 4:
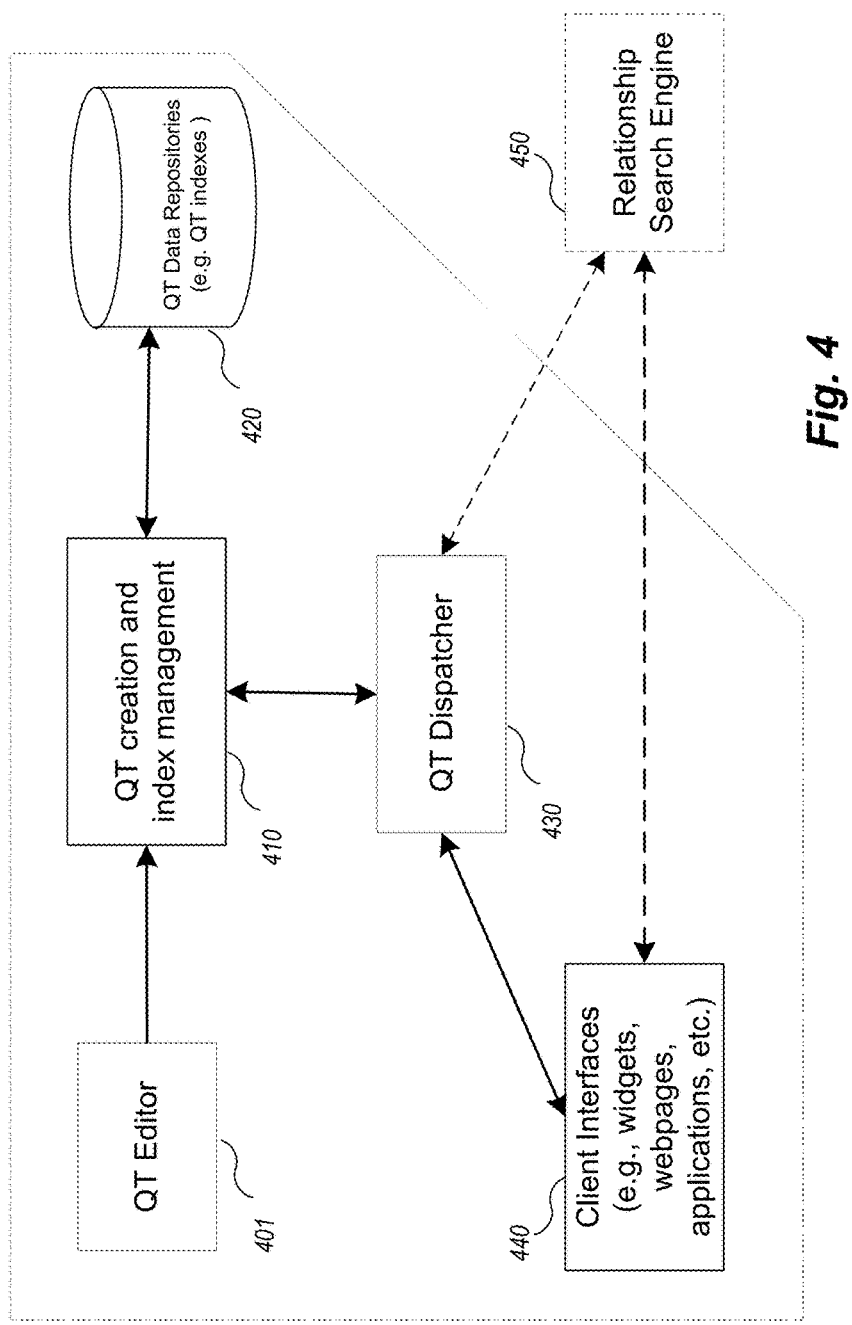
FIG. 4 is an overview block diagram of components of an example Query Template System.

FIG. 4 is an overview block diagram of components of an example Query Template System. In one embodiment, the QTS comprises one or more functional components/modules that work together to create, manage, and process query templates. These components may be implemented in software or hardware or a combination of both. In FIG. 4, a Query Template System comprises a query template ("QT") editor 401, a query template creation and index manger 410, one or more query template data repositories 420 (or indexes), a client interface that invokes the QTS 440, and a query template dispatcher 430. In some embodiments, one or more of these components may not be present. For example, in embodiments that automatically generate query templates, an explicit QT editor 401 may not be present. In any case, query templates are generated or edited and forwarded to the QT creation and index manager 410 for storage in the one or more data repositories 420. Once stored, a client interface 440, such as a widget, web page, portal, or other application code, can request from the QT dispatcher 430, one or more query templates that match a tag, trigger word, or other "key" to finding query templates. The QT dispatcher 430 uses the QT creation and index manager 410 to find and retrieve the appropriate QTs from, for example, the one or more data repositories 420, or as may be cached somewhere else, such as in proximity to the QT Dispatcher 430 or the client interface 440. Once the query templates are returned to the client interface 440, at some point a relationship search corresponding to one or more of the query templates is invoked by the relationship search engine 450. In different arrangements this may be accomplished, for example, by the client interface 440, through the QT dispatcher 430, or by some other means. In some embodiments, instead of or in addition to returning the query templates as described, the QT dispatcher may execute relevant searches using the search engine 450 and in some cases return or cache the results. Other embodiments can be similarly incorporated.

Figure 5:
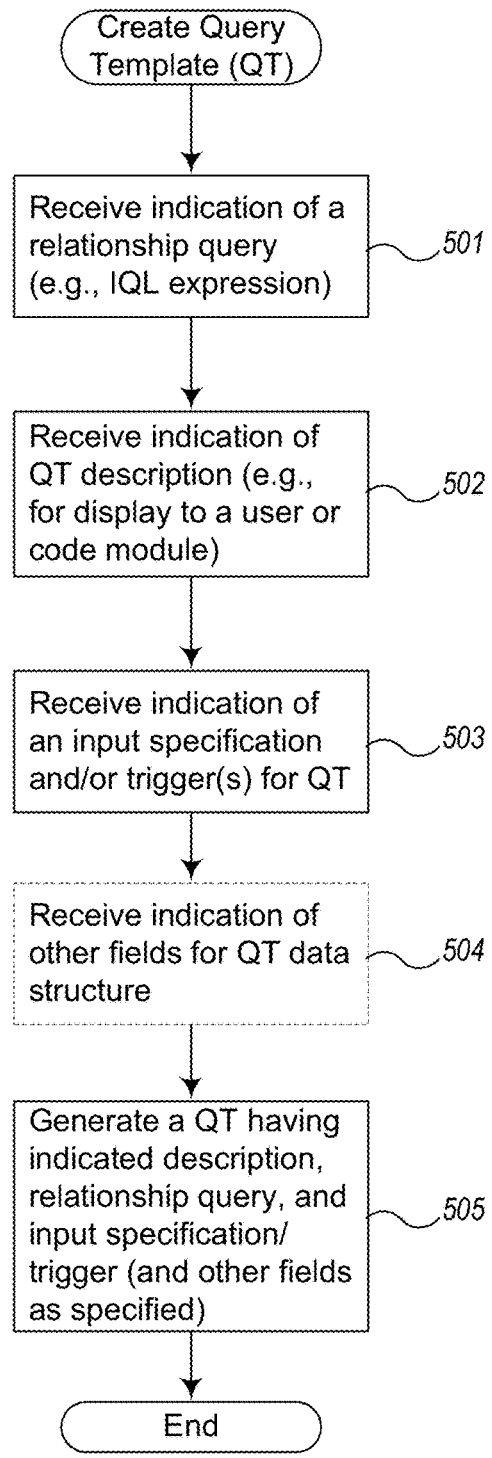
FIG. 5 is an example flow diagram of an overview process for creating a query template using a Query Template System.

FIG. 5 is an example flow diagram of an overview process for creating a query template using a Query Template System. In overview, in block 501, the QTS (or some portion thereof responsible for their creation) receives an indication of a relationship query such as an IQL expression. In block 502, the QTS receives an indication of a description of the query template, such as that used to identify the QT to a user on an input form (see FIG. 1A). In block 503, the QTS receives an indication of an input specification and/or triggers for retrieving appropriate query templates. For example, the input specification may be instructions to obtain an entity name from a user (e.g., FIGS. 3A and 3C) or may be a list of entity, topic, or concept triggers that automatically cause particular query templates to be retrieved or executed. In block 504, as relevant to the implementation, the QTS may receive indications of other parameters (values for QT attributes) such as an initial popularity indication, or a priority to associate with ordering the query template where it appears. Other parameters for other attributes may be similarly incorporated, such as output specifications. In block 505, a query template data structure is generated with the indicated description, query, input specification, triggers, and other fields as appropriate. The QTS then continues to perform other functions as needed.

As mentioned, there are several methods for creating query templates, including some performed typically by more advanced users and some performed automatically. In some embodiments, a query template editor, such as QT editor 401 of FIG. 4, may be provided to create, delete, and edit query templates. For example, in some embodiments an advanced user may run an IQL query and then, when satisfied with the results, invoke a minimally disruptive editor, for example by selecting a function such as through an "Add to Library" button (not shown) from a display of the relationship results, to define a query template to add to a "library" of query templates. The QTS may accomplish this by prompting the advanced user to enter various parameters that correspond to the attributes of the query template, such as those shown in FIGS. 2 and 3A-3D.

For example, suppose the user executes the query: [company]>buy>[company] to find information about all entities that are companies and that have bought other entities that are also considered companies, and decides it is a good query. The user may then click on a button Add to Library from the results window. The user is then prompted to enter a description of the query and tags for the query template. The user then enters: "Corporate Acquisitions by Company" for the Description field, and enters the tags: "corporate acquisitions, company acquisitions, and company buyouts". In addition, the user may be prompted to modify the associated IQL to account for input and output. For example, the user may change the IQL to express input and output specifications such as: user([company])>buy>display([company]).

As described above, the function "user( )" indicates to the IQL processing system that user input is desired that meets the form of any requirements specified within the parentheses of the function, and that this input is to be used in the associated relationship query. In this example, the user input is valid if it specifies a "company," which is an entity tag defined by the IQL processing system. The function "display( )" indicates to the IQL processing system that the results of running the associated query will display all matching results that are companies bought by one of the companies specified by the user. Thus, the associated IQL is "[company]>buy>[company]", where the first entity (the buyer(s)) is specified by the user, and the bought entities are displayed as a result. The user may then submit the query template which is then added to the query template library.

Figure 6A:
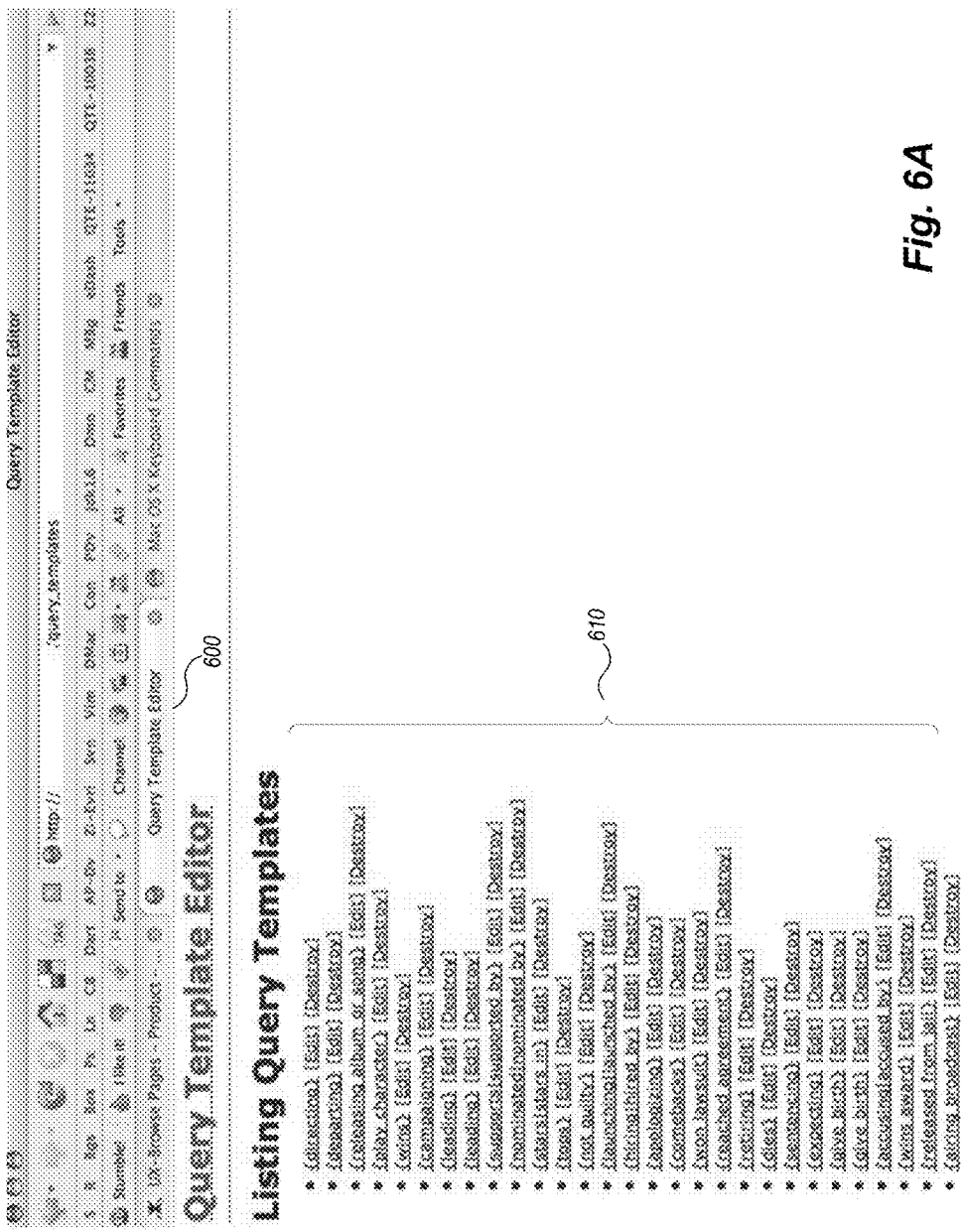
FIGS. 6A, 6B, and 6C are example screen displays from a query template editor client interface for creating and editing query templates managed by a Query Template System.
Figure 6B:
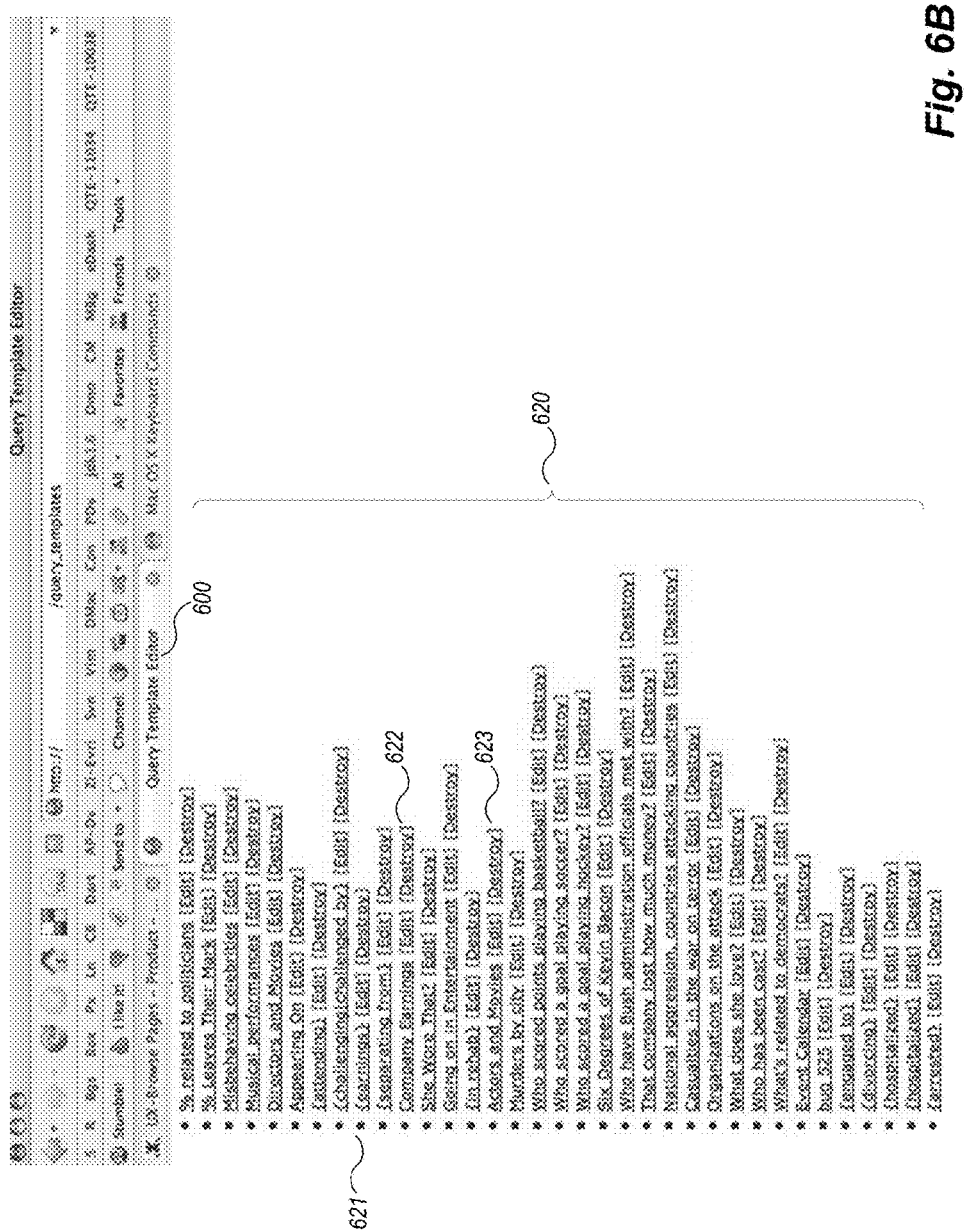
Figure 6C:
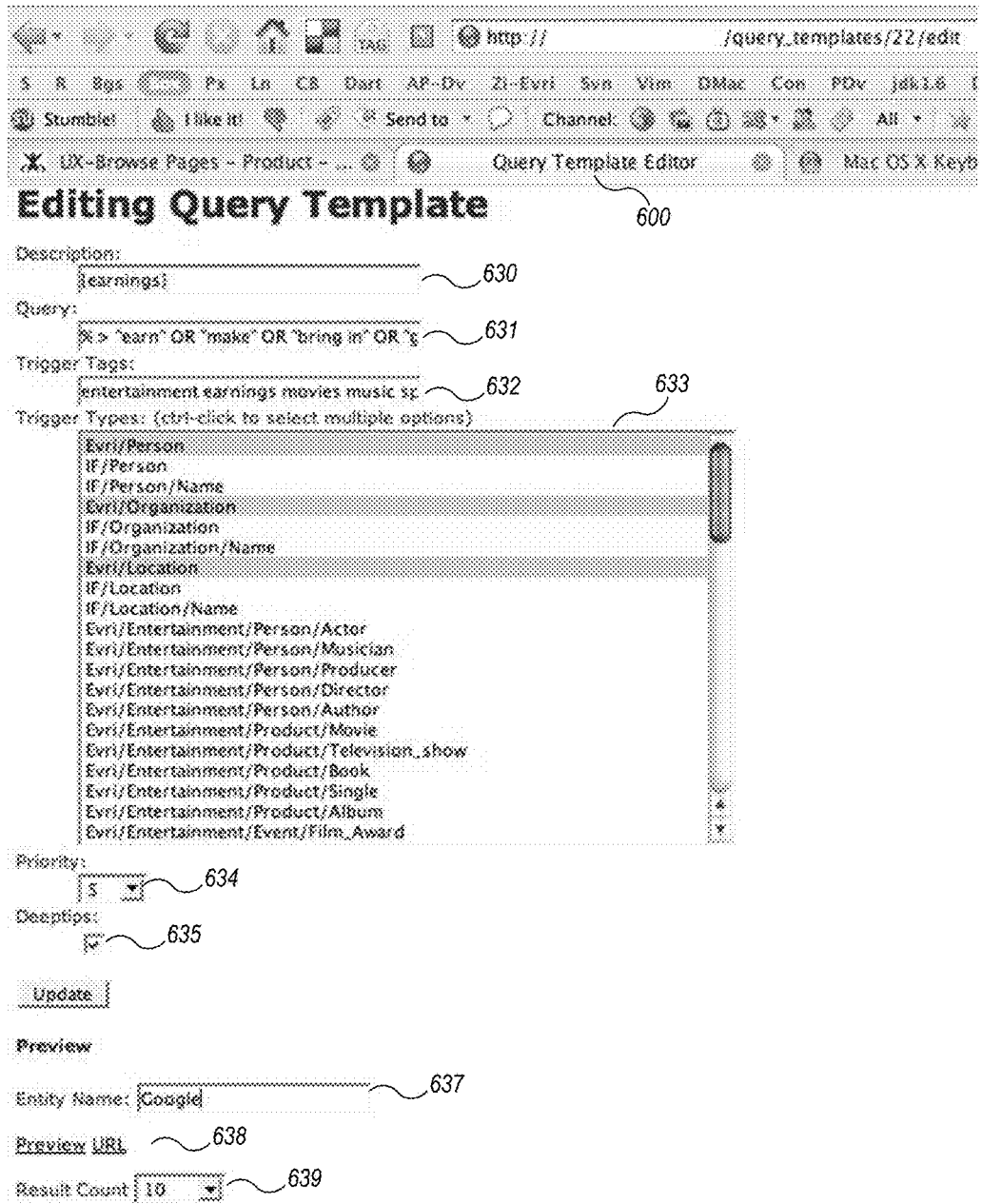

In other embodiments, users, third parties, etc. may utilize one or more separate editors for creating, deleting, and editing query templates. FIGS. 6A, 6B, and 6C are example screen displays from a query template editor client interface for explicitly creating and editing query templates managed by a Query Template System. In FIGS. 6A-6C, a client-side query template editor is being displayed in a standard web browser. Initially, the editor 600 is shown displaying a list of existing query templates. For example, in FIG. 6B, the query template indicated by list item 623 may correspond to a query used to produce the results demonstrated in FIG. 3E with regard to relationships between directors and movies. To create, edit, or delete an existing query template, the user selects one of the query template list items shown in the list of query templates 610 and 620 in FIGS. 6A-6B. For example, if the user selects the query template indicated by list item 621, the screen display shown in FIG. 6C is presented for editing the corresponding query template. In some embodiments, the description attribute of the query template is used as the description of the list item. In other embodiments, a separate attribute may be supplied. Of note, after each list item, such as 621-623, there appears a link to edit and a link to destroy the associate query template. Also, although a separate "create" link could be included in the interface, in the example shown, one can create new templates by saving an existing template to a new query template. Other permutations are possible.

FIG. 6C is an example query template editing page, invoked by selecting the query template list item 621 in FIG. 6B. Description input field 630 allows the user to modify the description attribute. Query input field 631 allows the user to specify and/or modify a query such as the IQL query snippet shown. Tags input field 632 allows the user to enter a series of keywords, which may be used to match or quickly retrieve tags. For example, a user (or code) may use a standard keyword search engine to find query templates using tags as long as the query templates are indexed (or stored in a data repository in a manner such that they are searchable) by tags. Trigger type selection field 633 allows the user to select one or more entities, concepts, or topics (anything that is supported by an ontology path entry) which will be "linked" by the QTS to retrieving this particular query template. Such trigger types are useful, for example, if the display (perusing, or retrieval) of information associated with one of the trigger types is to result automatically in presenting one or more related query templates for further browsing or for automatically displaying additional related information such as to automatically augment what is being displayed. The priority field 634 may be used for information in presenting this query template among other retrieved query templates. For example, different priorities may result in different rank orders in presenting the links to retrieved query templates. (E.g., a query template of priority "5" may be listed well below one of priority "2.") The deeptips field 635 is used to indicate that, when relationship searches associated with this particular query template are executed, relationship searches should additionally be done substituting particular entities for the parameters in the initial query. For example, if the entity "Jimmy Carter" led to the presentation of query template associated with the query '[politician]'>*>"Ronald Reagan"' then the query processing system may return results identifying specific politicians, like George H. W. Bush, who have performed an action against or to "Ronald Reagan" (other than Jimmy Carter). Fields 637, 638, and 639 can be used to test and preview results.

In addition to creating, deleting, and editing query templates by means of a query template editor, the QTS may in some embodiments be capable of automatically creating query templates. For example, using the navigation tip system described in U.S. Patent Publication No. 2007/0156669, published on Jul. 5, 2007, the user may select a presented tip, thereby causing the QTS to automatically generate and store a related query template.

Figure 7:
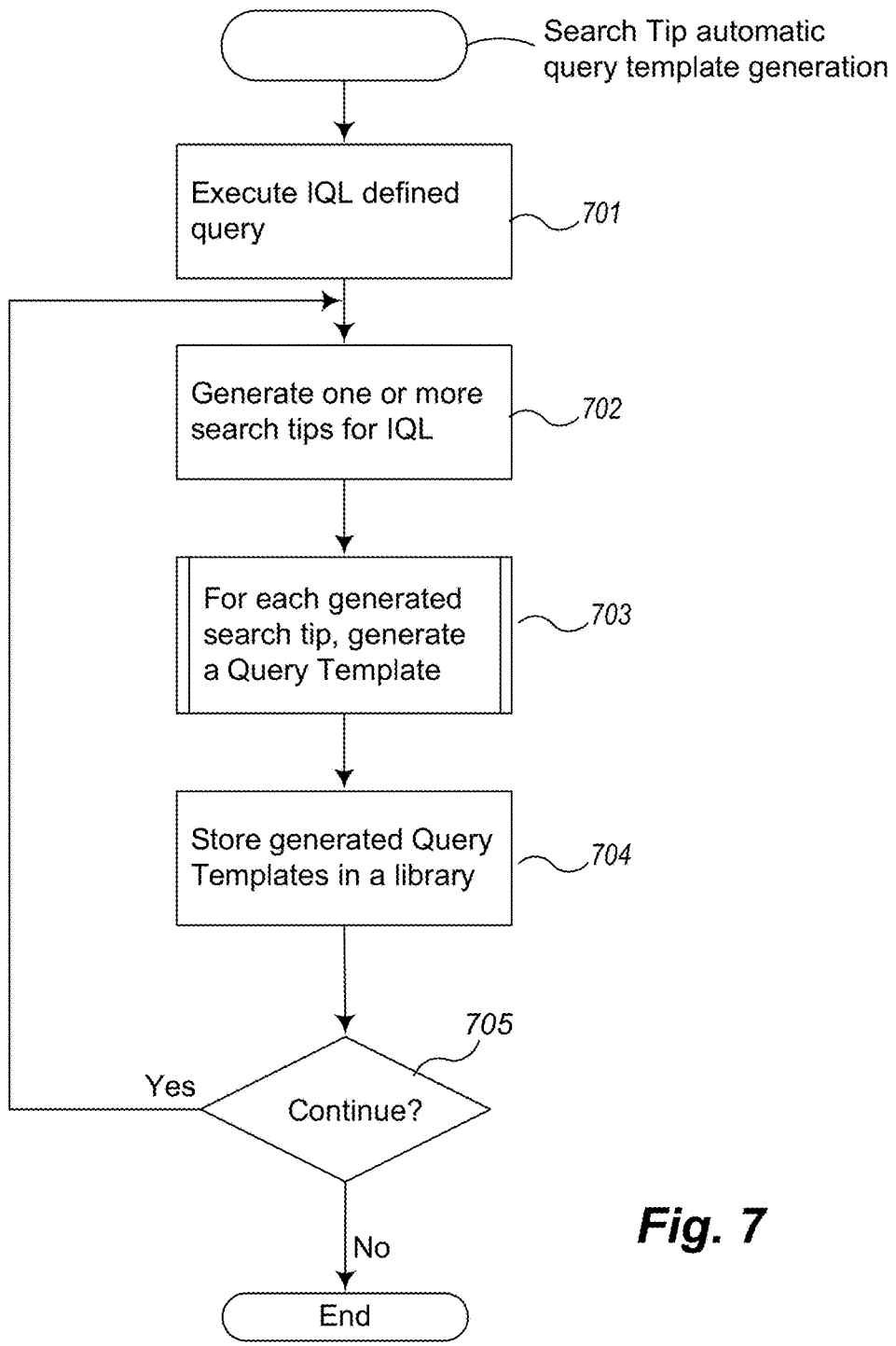
FIG. 7 is an example flow diagram of a process for automatically creating query templates such as from a search tip system.

FIG. 7 is an example flow diagram of a process for automatically creating query templates such as from a search tip system. In block 701, the system executes an IQL defined query (or is notified of the execution thereof). The system executing this routine may be part of an IQL processing system. In block 702, the system generates one or more search tips for the associated IQL query as discussed with reference to the navigation tip system. In block 703, the system generates a query template for each search tip determined (or presented, depending upon the timing). The sub-blocks for performing this process are described with reference to FIG. 8. In block 704, the system stores the generated query templates in a library of query templates, an inverted index, data repository, or equivalent structure for managing and efficiently retrieving query templates. In block 705, the system determines whether there are additional functions to perform, such as generating additional query templates for other queries, and, if so, continues in block 702, otherwise ends.

Figure 8:
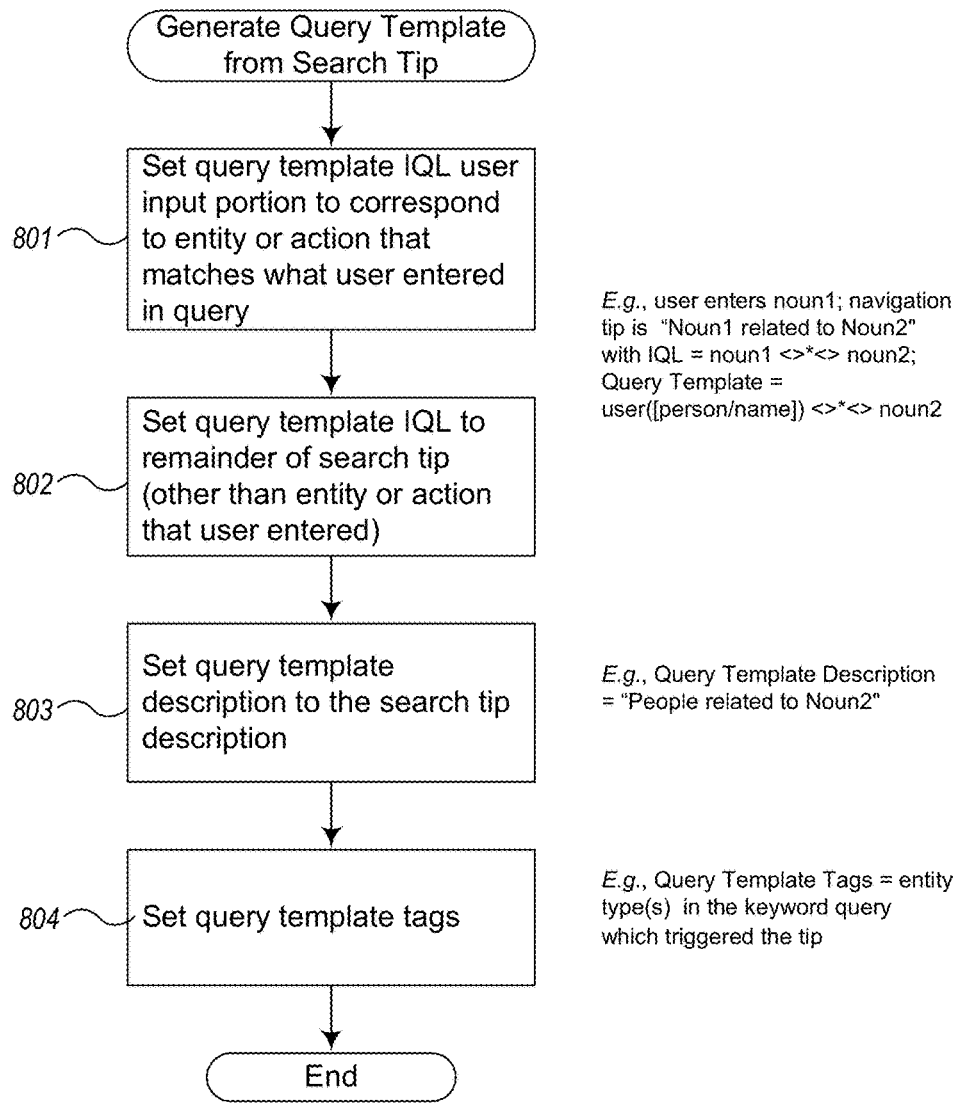
FIG. 8 is an example flow diagram of a sub-process for generating the query template from a specific search tip.

FIG. 8 is an example flow diagram of a sub-process for generating the query template from a specific search tip. As described with respect to FIG. 7, this process may be invoked for processing each search tip and is responsible for populating the attributes of a query template it constructs. Other blocks and other functions are possible and contemplated as they will likely vary with the attributes defined for a query template. In addition, query templates may be added to the query template library at tip rule parsing time, periodic intervals, when computational resources are made available, or at times other than when a user clicks on a tip.

In FIG. 8, the sub-process starts in block 801 with setting the input portion of the IQL to more broadly encompass what the user had entered in the initial (e.g., keyword) query or what corresponds to the parameterized portion of the search tip. For example, for interfaces that wish to present interactive query template forms such as that shown in FIG. 1A, the sub-process may enter 'user([person/name])' if the IQL for the corresponding search tip searched for is based upon a user search for "Jimmy Carter." Next, in block 802, the sub-process enters the rest of the IQL expression from the remainder of the IQL expression in the search tip. (Thus, the process builds up the IQL for the query template to include an input specification when desired.) In embodiments that do not present interactive input for query templates, block 801 and 802 may copy the search tip IQL into a query template query. In block 803, the sub-process sets the query template description from the search tip description. In block 804, the sub-process sets tags for the query template, for example, based upon the entity type of the (e.g., keyword) query that triggered the search tip. The sub-process then concludes.

For example, using the process of FIG. 7 and the sub-process of FIG. 8, suppose a user searches for "Ronald Reagan." A tip which reads: 'Ronald Reagan related to Any Person' appears. The user then clicks on this tip. A query template with the attributes:
  IQL: user([person/name])< >*< >[person/name]
  Description: People related to Any Person
  Tags: people
may then be entered into the query template library/index. In some embodiments, the system maintains mappings between actual OntologyPaths (e.g., a "person/name" or "organization") and their more colloquial counterparts, which may be used as tags. For example, in this example 'people' is a tag for the OntologyPath 'person/name.'

As another example, suppose a user searches for "Ronald Reagan." A tip which reads: 'Ronald Reagan related to Jimmy Carter' appears. The user then clicks on this tip. A query template with the attributes:
  IQL: user([person/name])< >*< >Jimmy Carter
  Description: People related to Jimmy Carter
  Tags: people, jimmy carter
may then be entered into the query template library/index.

Once defined, query templates may be stored for later retrieval in a data repository such as the QT Data Repositories 420 in FIG. 4. In some embodiments, the query templates are stored as "documents," which are then indexed in a reverse index (sometimes referred to as an inverted index) in the same way other documents may be stored and indexed in an InFact® IQL processing system. For example, each attribute and its value may be stored as terms of a document in a similar manner to the indexing of clauses with semantic and syntactic information. In some such embodiments, each attribute may be used as a key into the query template to allow greater flexibility. Note that other embodiments that use other data structures that store the same or similar information can be substituted. The inverted index is searchable by a query template searcher which can be implemented and integrated into the system as remote or distributed InFact® components similar to an Ontology Searcher or Tip Searcher. See, for example, U.S. Patent Publication No. 2005/0267871A1, published on Dec. 1, 2005. (When a tip searcher, such as that described in the preceding patent publication is used to implement the query template searcher, it can obtain a set of searches to execute as search tips by determining matching query templates from the inverted index instead of according to configured rules.) In addition, multiple query template searches can be executed against one of many query template searchers to handle significant load. These inverted indexes may be searched using a search application programming interface ("API") or a web interface.

Query templates may be retrieved in a variety of manners. For example, (if stored as above) a user may enter keywords into a standard search engine which are matched against the description and tag attributes of the indexed query templates. A list of query templates that match the keywords may then be returned by the system. The user may then select any of the query templates to execute their corresponding queries. In some embodiments, the corresponding queries are executed and results returned in conjunction with or instead of the list of query attributes.

Query templates may also be presented to a user automatically when they browse material on a web-page, through a portal, widget, application, etc. For example, the user may navigate to a social network site that ranks tags not only by popularity, but perhaps also by the number of query templates that include that tag. When a tag is selected by the user (e.g., using the ordinary interface), the user is presented with a list of query template descriptions ranked in part by usage popularity that are associated with the selected tag.

For example, the tags: Corporate, Entertainment, and Crime might be displayed on a site, where Corporate is associated with 5200 query templates, Entertainment is associated with 3000 query templates and Crime is associated with 159 query templates. Once the user clicks on a given tag, the user is presented with a list of query templates ranked in part by popularity. For example, when the user clicks on the 'Corporate' tag, the user may be presented with the following list:
 Corporate Acquisitions by City
 Corporate Acquisitions by Company
 Corporate Layoffs by Industry
 . . . [all or a portion of the 5200 items]
In this case, Corporate Acquisitions by City may have been used by users a total of 100,239 times, Corporate Acquisitions by Company may have been used by users a total of 52,103 times, and Corporate Layoffs by Industry a total of 10,234 times. In one embodiment, the query templates are presented in a ranked order based upon their popularity of use.

Query Templates may also be presented automatically when a user browses to a specific location, including for example, reading a news article, which contains one or more entities or ontology path specifications. When query templates have attributes such as those stored in FIG. 1E, they contain trigger types, which are used to automatically trigger the presentation of one or more query templates that are associated with those entity types or ontology path specifications. A list of possible query templates may be ranked (e.g., because the list is too large to present) based upon characteristics such as popularity, proximity, etc. A user wanting to discover additional related information can then select the link representation to the query template, in order to execute the associated query. In some embodiments, one or more of the query templates returned may be displayed with their associated query results.

Referring back to FIG. 4, retrieval in these manners is shown as the various client interfaces 440 sending a request for query templates (direct or indirect) to the QT dispatcher 430, which uses the indexing system 410 and 420 to return identification of one or more matching query templates, and, in some embodiments, to actually execute the associated queries to return results with the one or more matching query templates.

Figure 9:
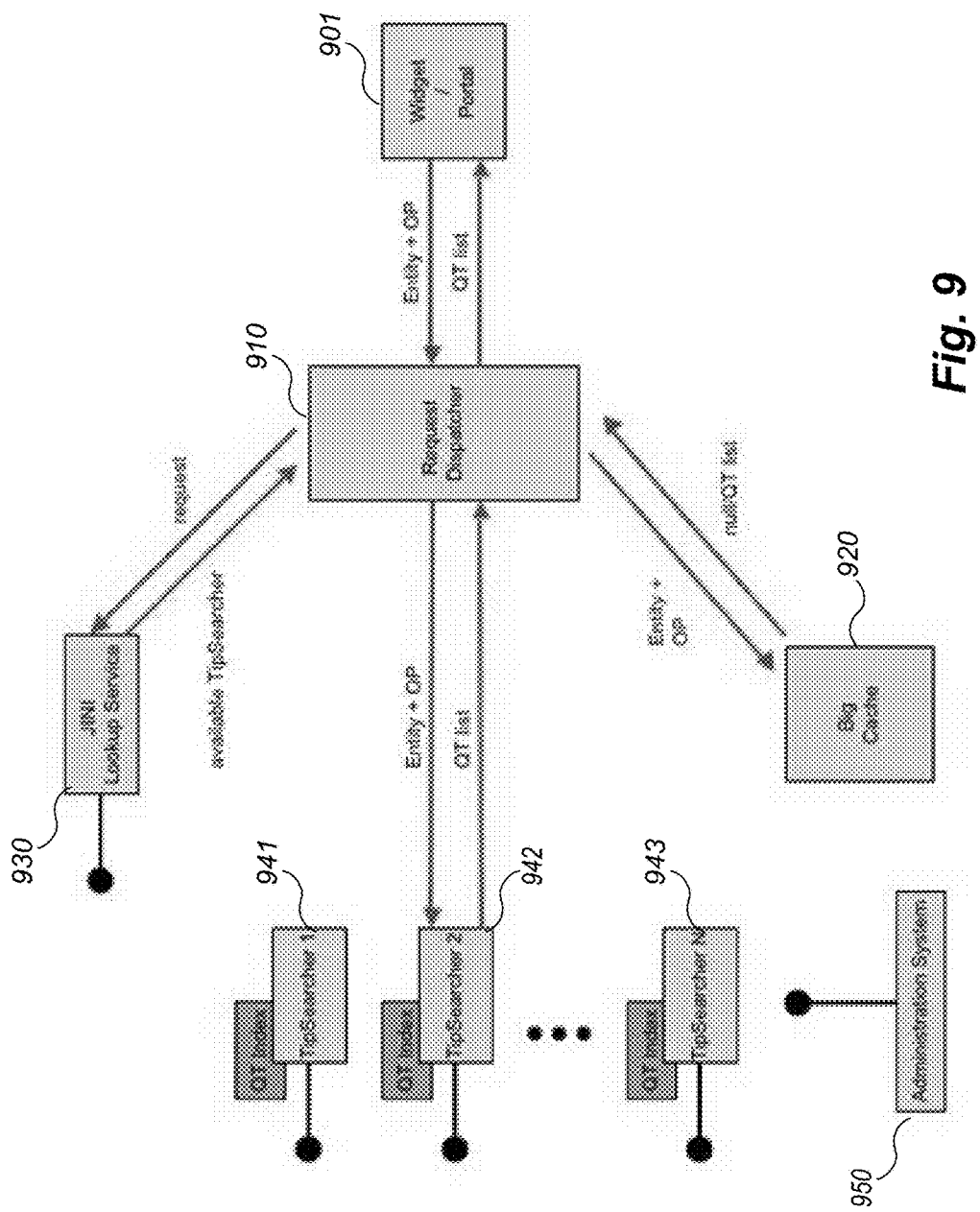
FIG. 9 is an example block diagram of the sub-components of an example Query Template System used for processing requests to retrieve query templates, for example, where the requests are triggered by an entity or ontology path specification.

FIG. 9 is an example block diagram of the sub-components of an example Query Template System used for processing requests to retrieve query templates, for example, where the requests are triggered by an entity or ontology path specification. In FIG. 9, the widget or portal (client portion) 901 communicates a request to the request dispatcher 910. Request dispatcher 910 may use a location server such as JINI lookup service 930 to locate an available tip searcher to process the request. The request dispatcher 910 then forwards (sends, or otherwise communicates) the request to one or more of the available tip searchers 941-943 to locate matching query templates. The one or more of the tip searchers 941-943 return back a list of matching query templates (e.g., by query template ID) to the request dispatcher 910, which in turn returns the list to the requesting client 901. In some embodiments, the available tip searchers 941-943 locate matching query templates and execute their associated queries. The results of the queries associated with query templates are then returned to the request dispatcher 910 as well, which can also be forwarded to the requesting client 901. This interaction may be beneficial to support, for example, client interfaces desiring to augment presented information without requiring the user to select a link to a query template to trigger execution of its associated query. In addition, in other embodiments, the tip searchers 941-943 locate matching templates and execute their associated queries. However, the results of the queries are returned to the request dispatcher 910 which stores them in cache 920 for efficient retrieval thereafter.

Figure 10:
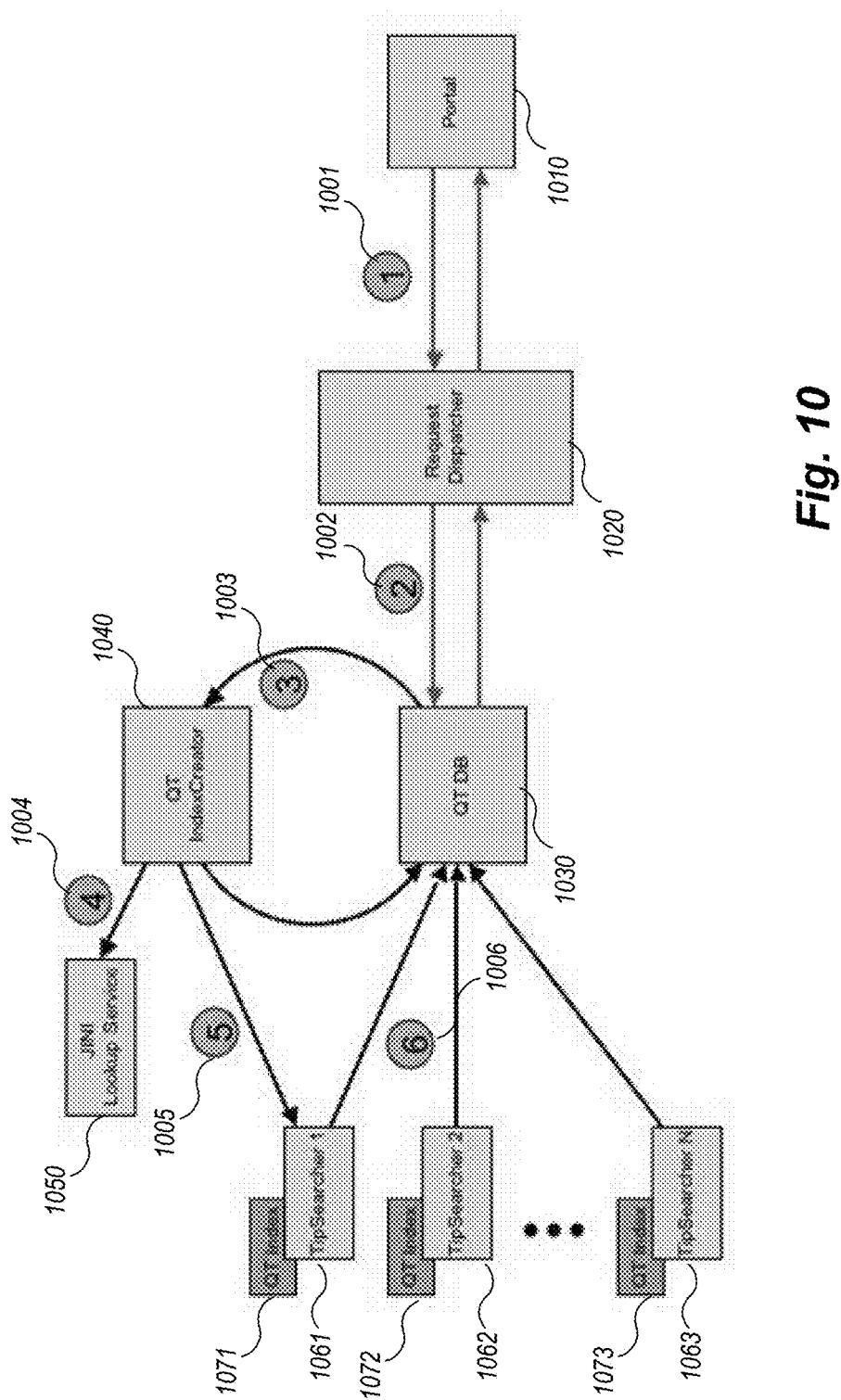
FIG. 10 is an example block diagram of events and interaction between example sub-components of a Query Template System to effectuate near real-time modification, management of query templates, and index creation.

FIG. 10 is an example block diagram of events and interaction between example sub-components of a Query Template system to effectuate near real-time modification, management, and indexing of query templates. At event 1001, a user editing a query template using, for example, portal 1010 creates, edits, or deletes a query template as described above. The request dispatcher 1020 then causes the appropriate change to be made, via event 1002, in the QT database 1030. Periodically, for example once every 10 minutes, at event 1003 the QT index creator 1040 iterates through every query template stored in the QT database 1030, and builds an index, such as a Lucene index. The QT index creator 1040 then stores the resulting index in the database 1030. At event 1004, the QT index creator 1040 then makes a request to the lookup service 1050 (e.g., a Jini lookup service) for all current tip searchers 1061-1063. At event 1005, the QT index creator 1040 then informs each current tip searcher 1061-1063 that a new index is available. At event 1006, each current tip searcher 1061-1063 obtains the new indices from the QT database 1030, and switches its live search index (corresponding QT indexes 1071-1073).

Figure 11:
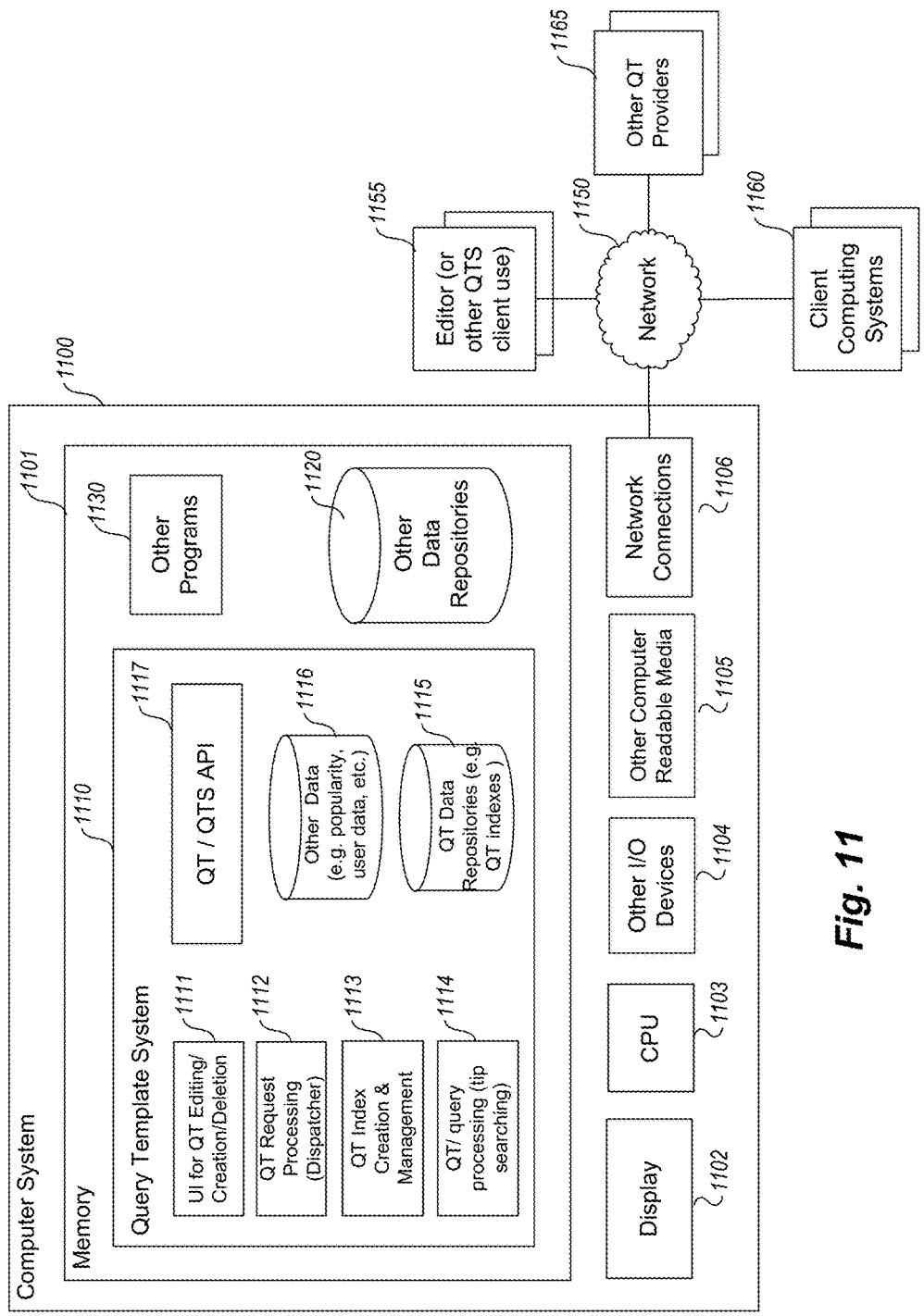
FIG. 11 is an example block diagram of a computing system for practicing embodiments of a Query Template System.

FIG. 11 is an example block diagram of an example computing system for practicing embodiments of a Query Template System described herein. Note that a general purpose or a special purpose computing system may be used to implement a QTS. Further, the QTS may be implemented in software, hardware, firmware, or in some combination to achieve the capabilities described herein.

The computing system 1100 may comprise one or more server and/or client computing systems and may span distributed locations. In addition, each block shown may represent one or more such blocks as appropriate to a specific embodiment or may be combined with other blocks. Moreover, the various blocks of the Query Template System 1110 may physically reside on one or more machines, which use standard (e.g., TCP/IP) or proprietary interprocess communication mechanisms to communicate with each other.

In the embodiment shown, computer system 1100 comprises a computer memory ("memory") 1101, a display 1102, one or more Central Processing Units ("CPU") 1103, Input/Output devices 1104 (e.g., keyboard, mouse, CRT or LCD display, etc.), other computer-readable media 1105, and one or more network connections 1106. The QTS 1110 is shown residing in memory 1101. In other embodiments, some portion of the contents, some of, or all of the components of the QTS 1110 may be stored on or transmitted over the other computer-readable media 1105. The components of the Query Template System 1110 preferably execute on one or more CPUs 1103 and manage the generation and use of query templates, as described herein. Other code or programs 1130 and potentially other data repositories, such as data repository 1120, also reside in the memory 1110, and preferably execute on one or more CPUs 1103. Of note, one or more of the components in FIG. 11 may not be present in any specific implementation. For example, some embodiments embedded in other software many not provide means for user input or display.

In a typical embodiment, the QTS 1110 includes one or more user interfaces such as a QT Editor 1111, one or more QT dispatchers 1112 for request processing, one or more QT creation and index managers 1113, one or more query template searcher 1114 (or tip searchers) and other components. In at least some embodiments, the query template processing (executing the queries associated with the query templates) is provided external to the QTS and is available, potentially, over one or more networks 1150. Other and/or different modules may be implemented. In addition, the QTS may interact via a network 1150 with application or client code on client computing systems 1160 to search for query templates, one or more query template editor computing systems or client-code 1155, and/or one or more third-party information provider systems 1165, such as to provide additional query templates from external systems (e.g., through import functions). Also, of note, the QT data repositories and indexes 1115 may be provided external to the QTS as well, for example in a Lucene index accessible over one or more networks 1150. Other data repositories 1116 may also be used by the QTS.

In an example embodiment, components/modules of the QTS 1110 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by a QTS implementation.

In addition, programming interfaces to the data stored as part of the QTS 1110 (e.g., in the data repositories 1115 and 1116) and to the query template retrieval functions and processing functions available through the other QTS components can be available by standard means such as through C, C++, C#, and Java APIs; libraries for accessing files, databases, or other data repositories; through scripting languages such as XML; or through Web servers, FTP servers, or other types of servers providing access to stored data. The data repositories 1115 and 1116 may be implemented as one or more database systems, file systems, or any other method known in the art for storing such information, or any combination of the above, including implementation using distributed computing techniques.

Also the example QTS 1110 may be implemented in a distributed environment comprising multiple, even heterogeneous, computer systems and networks. For example, in one embodiment, the QT editor 1111, the QT dispatcher 1112, and the QT data repository 1115 are all located in physically different computer systems. In another embodiment, various modules of the QTS 1110 are hosted each on a separate server machine and may be remotely located from the tables which are stored in the data repositories 1115 and 1116. Also, one or more of the modules may themselves be distributed, pooled or otherwise grouped, such as for load balancing, reliability or security reasons. Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of a QTS.

Furthermore, in some embodiments, some or all of the components of the QTS may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, such as media 1105, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/894,876, entitled "QUERY TEMPLATE AND LABELED NAVIGATION TIP SYSTEM AND METHODS," filed Mar. 14, 2007; U.S. patent application Ser. No. 11/012,089, entitled "METHOD AND SYSTEM FOR EXTENDING KEYWORD SEARCHING TO SYNTACTICALLY AND SEMANTICALLY ANNOTATED DATA," filed Dec. 13, 2004; U.S. patent application Ser. No. 11/601,612, entitled "EXTENDING KEYWORD SEARCHING TO SYNTACTICALLY AND SEMANTICALLY ANNOTATED DATA", filed Nov. 16, 2006; and U.S. patent application Ser. No. 12/049,184, entitled "QUERY TEMPLATES AND LABELED SEARCH TIP SYSTEM, METHODS, AND TECHNIQUES", filed Mar. 14, 2008, are incorporated herein by reference, in their entirety.

From the foregoing it will be appreciated that, although specific embodiments have been described herein for purposes of illustration, various modifications may be made without deviating from the spirit and scope of the present disclosure. For example, the methods, systems, and techniques for creating and using query templates discussed herein are applicable to other architectures other than a client-server architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for automatically generating a relationship query comprising:
receiving an indication of a relationship query specification that specifies a relationship query having grammatical clause based information regarding one or more entities, entity types, actions, action types, topics, concepts, or ontology paths;
receiving an indication of a description of the indicated relationship query specification;
receiving an indication of an input specification to associate with the indicated relationship query specification that indicates what user query input is to be obtained for the relationship query specified by the relationship query specification, wherein the indication of the input specification is received before the user query input;
receiving an indication of an output presentation specification to associate with the indicated relationship query specification that indicates how search results of the relationship query specified by the relationship query specification are to be presented, wherein the indication of the output specification is received before the user query input; and
generating a query template that stores the indicated input specification and the indicated output presentation specification as part of the relationship query specified by the indicated relationship query specification and stores the indicated description, such that the generated query template, when triggered, evaluates the user query input based upon the input specification stored as part of the relationship query and automatically executes the associated relationship query to generate search results that are presented according to the output presentation specification stored as part of the relationship query specification.

2. The method of claim 1 wherein the indicated input specification specifies an interactive input specification and the generated query template, when triggered, presents a prompt for user query input based upon the stored input specification.

3. The method of claim 2, further comprising, when input is received in response to the presented prompt, the relationship query stored in the query template is executed to generate the search results.

4. The method of claim 1 wherein the indicated input specification indicates at least one of an entity, an entity type, a topic, a concept, or an ontology path to be supplied by at least one of a user or calling program code.

5. The method of claim 1 wherein the indicated input specification is a trigger that is matched to an entity, entity type, a topic, a concept, or ontology path specification received from client code.

6. The method of claim 1, further comprising presenting the description stored in the query template when the query template is triggered.

7. The method of claim 1 wherein the relationship query stored in the query template is specified using one or more IQL expressions.

8. The method of claim 1, further comprising presenting an interface for adding an interactive input capability to the specified relationship query for receiving the indication of the input specification to associate with the indicated relationship query specification.

9. The method of claim 1 wherein the query template is generated as a result of generating a search tip associated with a search query.

10. The method of claim 9 wherein the generated search tip is an automatically generated search tip based in part upon a designated set of relationship queries that are automatically executed in response to input of a search term or phrase.

11. The method of claim 10 wherein the generated search tip results from a nonempty result of executing one or more of the designated set of relationship queries.

12. The method of claim 10 wherein the search term or phrase is at least one of one or more keywords or a relationship query specification.

13. The method of claim 9 wherein the relationship query specification of the generated query template corresponds at least in part to a relationship query specification associated with the generated search tip.

14. The method of claim 1, further comprising presenting an interface for receiving the indication of the description of the indicated relationship query specification.

15. The method of claim 1, further comprising receiving an indication of one or more tags to associate with the indicated relationship query specification.

16. The method of claim 15 wherein the one or more tags are user definable labels that can be associated with one or more of relationship queries, keyword searches, or web pages.

17. The method of claim 15 wherein the one or more tags are used for keyword matching by a search engine.

18. The method of claim 1, further comprising presenting the generated query template as part of a ranked list.

19. The method of claim 1 wherein the query template, when triggered, executes the stored relationship query to generate search results that are displayed as relationships between two or more entities.

20. The method of claim 1 wherein each relationship indicates an event or action involving the two or more entities.

21. The method of claim 1 wherein the query template when triggered executes the stored relationship query to generate search results that are displayed as a list of entities.

22. The method of claim 1 wherein the output specification identifies attributes of a table and the query template, when triggered, displays search results of the executed stored relationship query as a table formatted according to the output presentation specification.

23. The method of claim 1, further comprising retrieving the generated query template based at least in part upon matching a received one or more terms to the indicated description stored in the query template.

24. A non-transitory computer-readable storage medium containing instructions that, when executed, produces augmented information by performing a method comprising:
- receiving an indication of a relationship query expression that provides grammatical clause based information;
- receiving an indication of an input specification to associate with the indicated relationship query expression that indicates what user query input is to be obtained for the relationship query expression, wherein the indication of the input specification is received before the user query input;
- receiving an indication of an output presentation specification to associate with the indicated relationship query expression that indicates how search results of the relationship query expression are to be presented, wherein the indication of the output specification is received before the user query input; and
- generating a query template that stores the indicated relationship query expression and stores the indicated input specification and the indicated output presentation specification as part of the stored relationship query expression such that the generated query template is configured, when triggered, to retrieve input based upon the input specification stored as part of the stored relationship query expression and to execute the stored relationship query expression to generate search results that are presented according to the output presentation specification stored as part of the stored relationship query expression to produce the augmented information.

25. The computer-readable medium of claim 24 wherein the medium is a computer memory.

26. The computer-readable medium of claim 24 wherein the medium is computer memory of the computing system and then contents are instructions that control a computer processor to perform the method.

* * * * *